(12) United States Patent
Ng et al.

(10) Patent No.: US 7,843,434 B2
(45) Date of Patent: Nov. 30, 2010

(54) OPTICAL MOUSE WITH A WAVELENGTH CONVERTING LAYER

(75) Inventors: Kee Yean Ng, Penang (MY); Fook Main Heng, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 965 days.

(21) Appl. No.: 11/224,516

(22) Filed: Sep. 12, 2005

(65) Prior Publication Data
US 2007/0057919 A1    Mar. 15, 2007

(51) Int. Cl.
*G06F 3/033*    (2006.01)
*G09G 5/08*    (2006.01)

(52) U.S. Cl. .................................................. 345/166
(58) Field of Classification Search ......... 345/156–184; 445/24; 353/119
See application file for complete search history.

(56) References Cited

U.S. PATENT DOCUMENTS

| | | | |
|---|---|---|---|
| 6,417,019 B1 * | 7/2002 | Mueller et al. ................ | 438/29 |
| 7,180,609 B2 * | 2/2007 | Silverbrook et al. ......... | 358/1.1 |
| 2003/0103262 A1 * | 6/2003 | Descour et al. .............. | 359/368 |
| 2004/0036079 A1 * | 2/2004 | Nakada et al. ................ | 257/81 |
| 2004/0189604 A1 * | 9/2004 | Lee ............................ | 345/163 |
| 2004/0203312 A1 * | 10/2004 | Bortscheller et al. ......... | 445/24 |
| 2005/0041160 A1 * | 2/2005 | Monch ........................ | 348/739 |
| 2005/0117130 A1 * | 6/2005 | Bohn et al. ................. | 353/119 |
| 2005/0231482 A1 * | 10/2005 | Theytaz et al. .............. | 345/166 |
| 2006/0018031 A1 * | 1/2006 | Takasugi .................... | 359/661 |
| 2006/0028442 A1 * | 2/2006 | Bynum et al. ............... | 345/157 |
| 2006/0044267 A1 * | 3/2006 | Xie et al. .................... | 345/157 |

* cited by examiner

*Primary Examiner*—Chanh Nguyen
*Assistant Examiner*—Sanghyuk Park

(57) ABSTRACT

A pointing device having an illumination system, an imaging array, and a controller is disclosed. The illumination system illuminates a surface over which the pointing device moves, the illumination system generating a light signal having first and second spectral regions. A portion of the light signal is viewable by a user of the pointing device. The first spectral region includes visible light of a predetermined color and the second spectral region includes infrared light. The imaging array records a plurality of images of the illuminated surface and is sensitive to light in the second spectral region. The second spectral region can be chosen to match the sensitivity of a silicon imaging array, while the first spectral region provides a decorative glow that is seen by the user.

11 Claims, 6 Drawing Sheets ed States Patent

OPTICAL MOUSE WITH A WAVELENGTH CONVERTING LAYER

BACKGROUND OF THE INVENTION

Most desktop computer systems utilize a handheld pointing device referred to as a "mouse". The mouse provides a signal to the computer indicating the amount the mouse has been moved over the desktop since its last report. The displacement of the mouse is used to control the displacement of a cursor on the computer screen. Typically, the cursor moves from its current location to a new location having a displacement that is related to the measured displacement of the mouse on the desktop.

The mouse also typically includes a number of buttons or wheels that are used to signal the computer. For example, one of these buttons typically causes the computer to select an item on the screen that is under the cursor when the button is pushed. A second button is often used to display a short menu on the screen having commands that the user can execute.

Early mouse designs utilized a ball that rolls against two encoders as the user moves the mouse over the desktop. The output of the encoders provides a measurement of the distance traveled by the mouse. While this mouse design provided an inexpensive pointing device, it had a number of problems. First, the ball picked up grease and other debris from the surface of the desktop and transferred this material to the rollers used in the encoders. Over time, the buildup of the debris on the rollers resulted in a degradation in the performance of the mouse, and hence, the mouse required periodic cleaning. Second, the mechanical nature of the device made it difficult to reduce the cost of the device beyond a certain point.

As a result of these limitations and the decrease in cost of semiconductor imaging arrays and processors, the optical mouse was introduced. An optical mouse includes a "camera" that periodically takes a picture of the surface under the mouse. The successive pictures are compared to one another to determine the distance that the mouse moved between pictures. The device has no moving parts, and hence, the difficulties associated with the mechanical mouse are substantially reduced. In addition, the camera is recessed with respect to the bottom surface of the mouse, and hence, the camera does not become fouled by grease and other debris on the desktop surface.

The cameras used in optical mice are typically constructed from silicon imaging arrays to reduce the cost of the camera. Silicon imaging arrays have their maximum sensitivity in the wavelength range from about 600 nm to 100 nm, and are most sensitive in the region from 800 nm to 900 nm. The red LEDs used in optical mice typically emit light in the range of 620 to 660 nm. Hence, prior art optical mice have a less than optimum match between the LEDs used to illuminate the surface and the silicon imaging arrays used to form the image. As a result, the power requirements of the mouse are increased. The power needed to operate the mouse is particularly important in wireless optical mice, since batteries must supply the power.

In addition, optical mice typically emit a flashing red glow. To minimize power consumption and to provide an electronic shutter, the LED is only turned on when an actual image of the surface is being formed. When the light is turned on, a portion of the light often escapes the mouse. Some mouse designs specifically allow a portion of the light to escape to enhance the appearance of the mouse. Some users find the color less than appealing. In addition, the flashing light can be distracting.

SUMMARY OF THE INVENTION

The present invention includes a pointing device having an illumination system, an imaging array, and a controller. The illumination system illuminates a surface over which the pointing device moves, the illumination system generating a light signal having first and second spectral regions. A portion of the light signal is viewable by a user of the pointing device. The first spectral region includes visible light of a predetermined color and the second spectral region includes infrared light. The imaging array records a plurality of images of the illuminated surface and is sensitive to light in the second spectral region. The controller records first and second images taken by the imaging array at different times and determines a displacement indicative of the direction and distance the positioning device moved between the two different times. In one embodiment, the second spectral region is from 600 nm to 100 nm, and preferably the second spectral region is from 800 nm to 900 nm. In one embodiment, the imaging array includes a silicon imaging array. In one embodiment, the illumination system includes a light-emitting device that emits light that includes light of a first wavelength and a light converting layer that converts a portion of the light of the first wavelength to light of a second wavelength, the second wavelength is in the second spectral region. In one embodiment, the first wavelength is in the first spectral region. In one embodiment, the light converting layer further includes a material that converts a portion of the light of the first wavelength to light of a third wavelength, the third wavelength being in the first spectral region. In one embodiment, the pointing device further includes a housing that contains the illumination system and wherein the conversion layer includes a module that is inserted in the housing.

DETAILED DESCRIPTION OF THE PREFERRED EMBODIMENTS OF THE INVENTION

Figure 1:
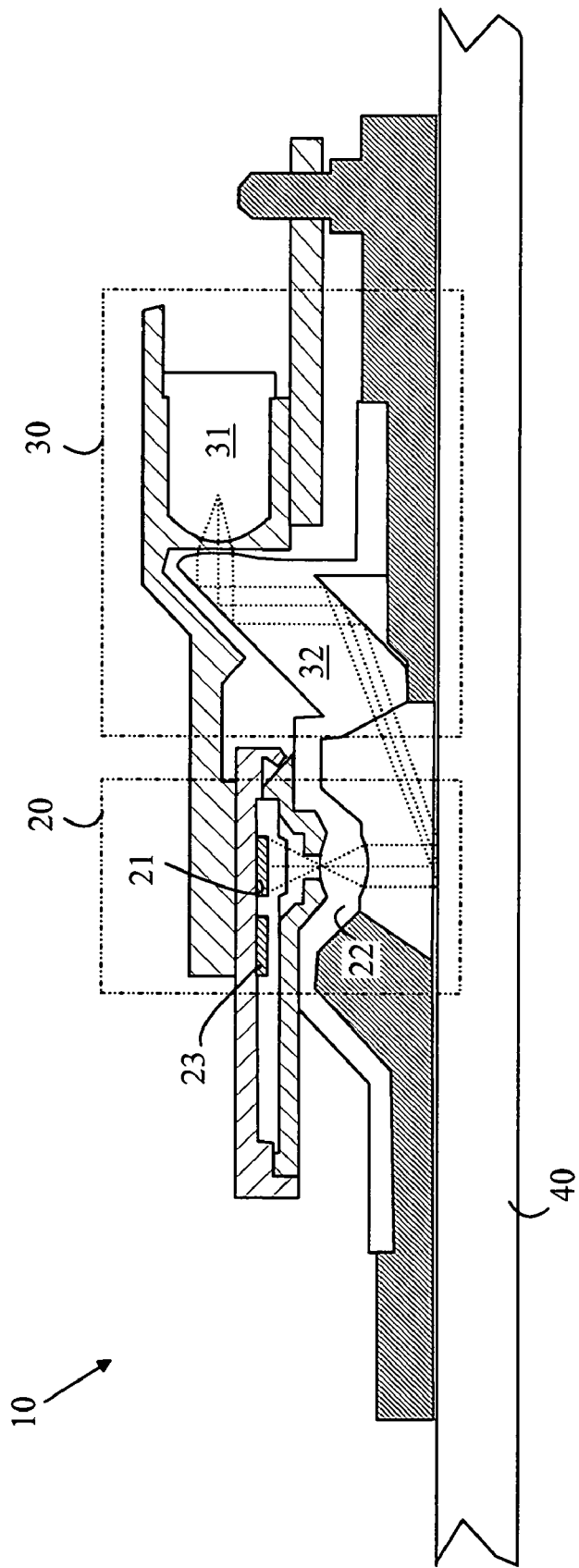
FIG. 1 is a simplified cross-sectional view of an optical mouse 10 that moves over an opaque substrate.

The manner in which the present invention provides its advantages can be more easily understood with reference to FIG. 1, which is a simplified cross-sectional view of an optical mouse 10 that moves over an opaque surface 40. Mouse 10 may be viewed as having two principal components, an illumination section 30 and an imaging section 20. Illumination section 30 typically includes an LED light source 31 and an optical assembly 32 that illuminates surface 40 with collimated light that strikes the surface at a shallow angle relative to the surface. Light from the illuminated portion of the surface is imaged by the imaging section onto a sensor 21 with the aid of a lens assembly 22. Sensor 21 is a two-dimensional array of imaging elements that forms an image of a portion of surface 40.

When the mouse is moved relative to the surface, the image shifts on sensor 21. If images are taken sufficiently close together in time, each successive image will contain a portion of the previous image. Hence, by comparing two successive images, mouse 10 can determine the offset between the images. For example, mouse 10 can compute the correlation of the first image shifted by various amounts with the second image. The shift that provides the highest correlation is assumed to be the displacement of the mouse during the period of time that elapsed between the times at which the two images were taken. In the embodiment shown in FIG. 1, it is assumed that a controller 23 performs the displacement computations and outputs a signal indicative of the motion. However, embodiments in which the image is output to a computer attached to the optical mouse can also be constructed.

As noted above, prior art optical mice utilize illumination sources that are not well matched to the imaging array. In addition, the color of the light that leaks out of the mouse is not always the desired color from the user's point of view. Some users would prefer no light leakage, while others would prefer a different color such as blue.

Figure 2:
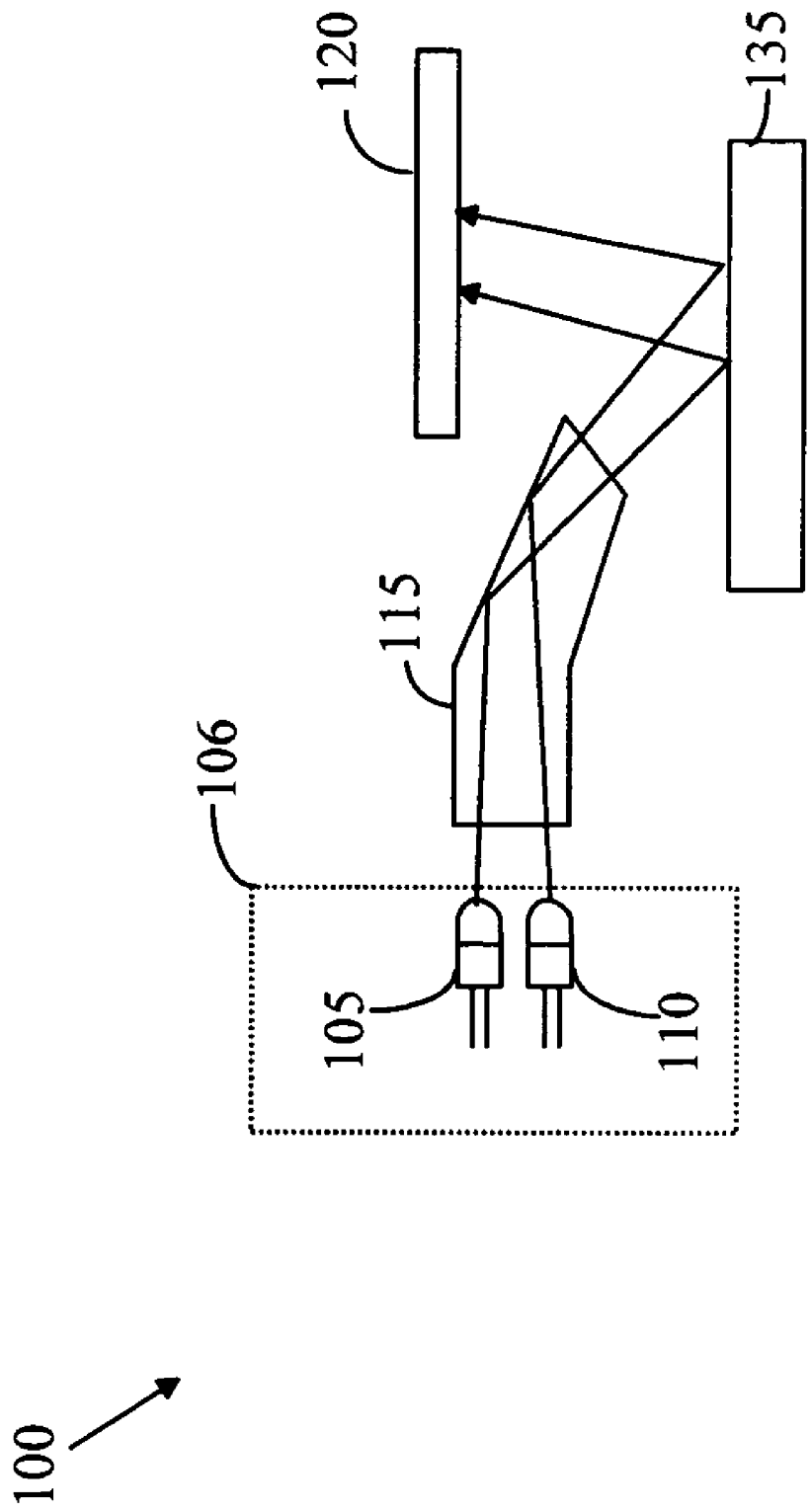
FIG. 2 is a simplified cross-sectional view of an optical mouse 100 that moves over a surface.

One solution to this problem utilizes two LEDs in place of LED 31 shown in FIG. 1. Refer now to FIG. 2, which is a simplified cross-sectional view of an optical mouse 100 that moves over a surface 135. Surface 135 is illuminated by a light source 106 that includes two LEDs shown at 105 and 110. The light from light source 106 is directed onto surface 135 by light pipe 115. The light reflected from surface 135 is imaged onto an imaging array 120.

The light from LED 110 has a wavelength that is in the range that is detected by imaging array 120, and preferably in a range that is not readily visible to a person looking at the outside of the mouse. Since silicon-based imaging arrays are inexpensive and have high efficiency in the infrared region of the spectrum, the light from LED 110 is preferably in the infrared region of the spectrum.

The light from LED 105 provides the "decorative" appearance of the mouse, and hence, preferably has a wavelength that is in a range that is viewable by a person looking at the mouse. Different wavelengths can be utilized in different mice so that the user can pick the color of light that the mouse emits. For example, LED 105 could be a blue LED, and hence, the mouse would emit a blue glow.

While this arrangement allows the user to have a decorative color while still utilizing inexpensive silicon-based imaging arrays, it has a number of problems. First, the cost of the mouse is significantly higher that a conventional optical mouse because of the addition of the second LED. In addition to the cost of the LED, a different LED mount is required to position the two LEDs in the mouse, and hence, additional tooling costs are incurred to provide this decorative feature.

Second, the power utilized by the mouse is increased relative to one LED light source, as two separate LEDs must now be driven by the power supply. This problem is particularly relevant in systems that rely on battery power to power the mouse such as mice that are attached to laptop computers or wireless mice.

Third, when an inexpensive red LED is used for LED 110, the light emitted by the LED does not match the maximum sensitivity of the silicon-based sensors. Hence, a higher power LED is required to compensate for the lower detection efficiency of the inexpensive imaging array.

Figure 3:
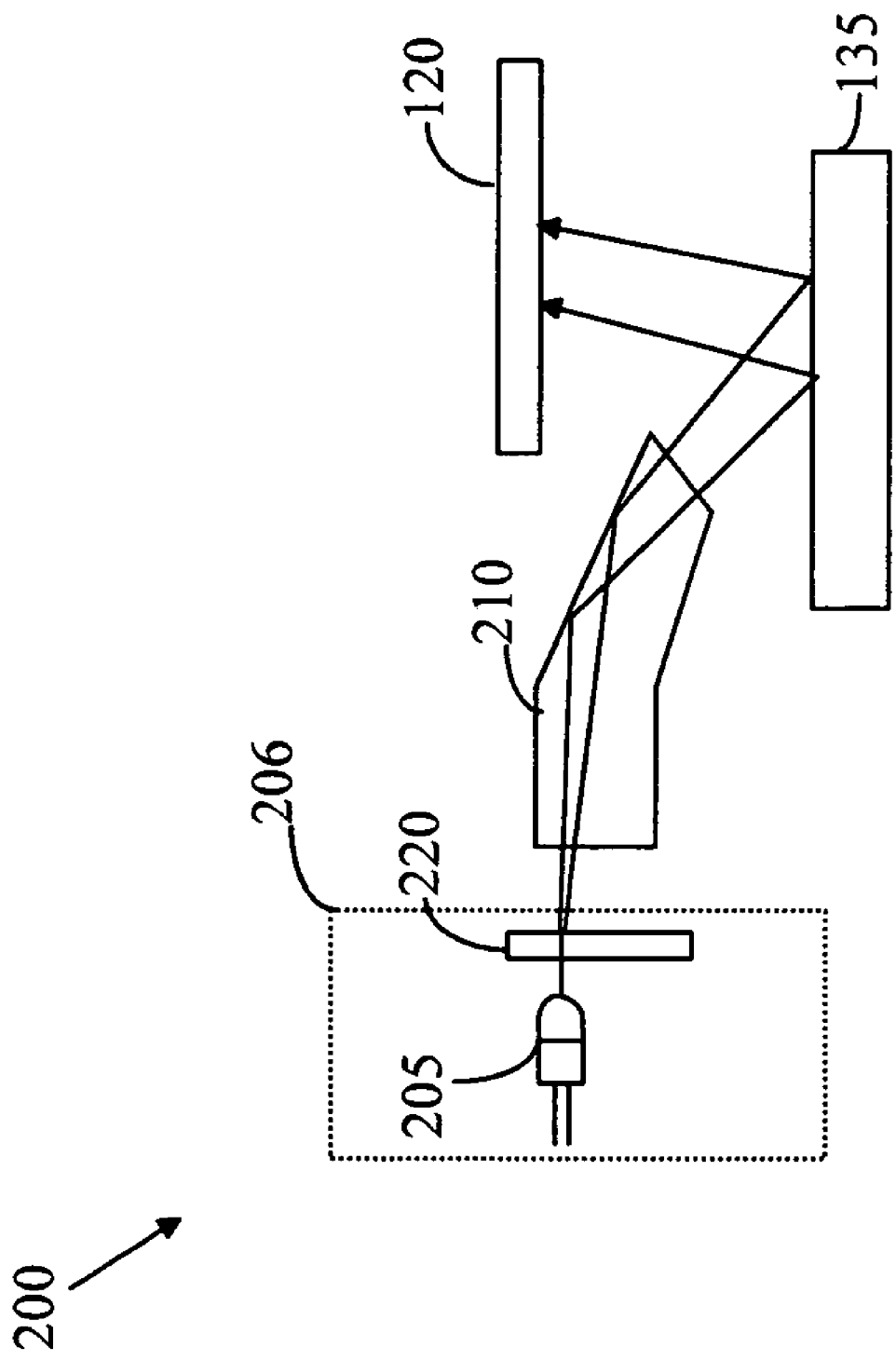
FIG. 3 is a simplified cross-sectional drawing of a mouse 200 according to one embodiment of the present invention.

Refer now to FIG. 3, which is a simplified cross-sectional drawing of a mouse 200 according to one embodiment of the present invention. Mouse 200 utilizes a light source 206 that emits a light spectrum having light in two spectral regions. The light from light source 206 is directed to surface 135 by light pipe system 210 in a manner analogous to that discussed above. The light reflected by surface 135 is imaged onto imaging array 120.

As noted above, the light from light source 206 includes light in two spectral regions. The first region is in the visible and provides the "glow" seen by the user of the mouse. The second region is in the infrared, preferably in the infrared at wavelengths corresponding to the maximum sensitivity of imaging array 120.

Light source 206 is constructed from an LED 205 and a phosphor converter 220 that converts part of the light from LED 205 to light of a longer wavelength. The phosphor is preferably chosen to emit light in the 600 nm to 1000 nm region of the spectrum with a peak emission between 800 nm and 900 nm. Such an emission spectrum is a good match to the sensitivity profile of the inexpensive silicon-based imaging arrays that are used in optical mice.

As noted above, the first region of the spectrum emitted by light source 206 is in the visible region and chosen to provide the decorative glow from the mouse. Utilizing an LED that emits light of the desired color can provide the desired region of the spectrum. In general, LED 205 is chosen to emit light of a shorter wavelength than the light emitted by the phosphor. In one embodiment, an LED that provides light of the color desired for the decorative glow is utilized. The phosphor layer thickness is adjusted to assure that some of the light from the LED will pass through the phosphor layer unconverted. Hence, the light leaving the phosphor layer will be a combination of the LED light and the light emitted by the excited phosphor. For example, a blue LED can be used to excite a phosphor that emits light in the infrared. The resultant mouse would have a blue glow, but the imaging system would be operating in the infrared to provide high light detection efficiency.

An embodiment in which the mouse does not produce a glow can be constructed by utilizing a phosphor layer that is thick enough to convert all of the light from the LED. In this case, the light escaping from the mouse will be at wavelengths in the infrared, preferably at wavelengths outside the visible range.

While the above-described embodiments can provide a mouse having a desired decorative glow color and high light efficiency for the imaging system, these embodiments are less than optimum if a number of different decorative colors are to be offered to the users. To change the decorative color, LED 205 must be changed to an LED that provides the new color. In addition, the phosphor layer might also need to be altered, since the previously used phosphor might not efficiently convert light of the new decorative color to the light in the infrared for use by the imaging system.

Figure 4:
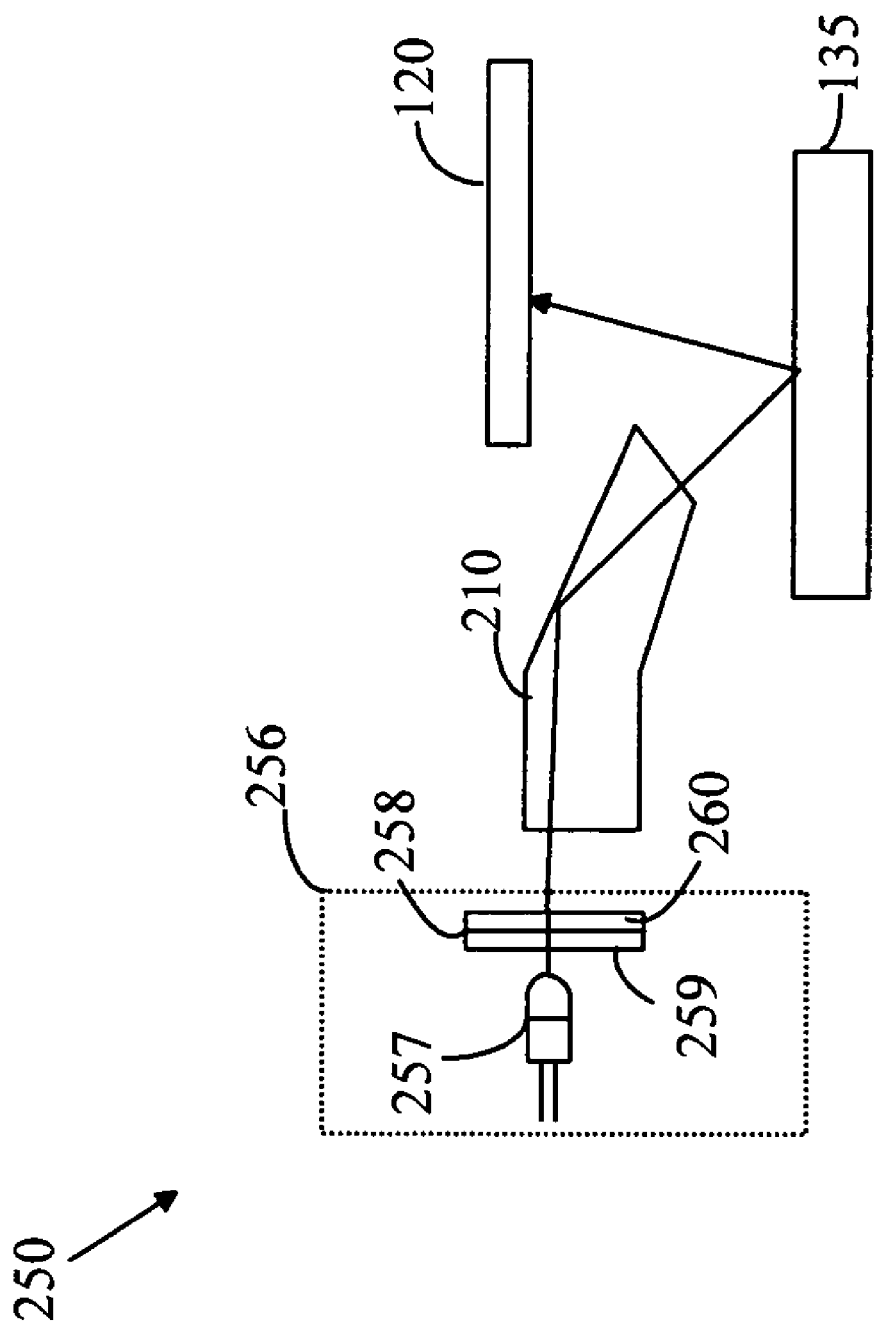
FIG. 4 is a simplified cross-sectional view of a mouse 250 according to another embodiment of the present invention.

Refer now to FIG. 4, which is a simplified cross-sectional view of a mouse 250 according to another embodiment of the present invention. To simplify the following discussion, those elements of mouse 250 that serve functions analogous to functions described above with reference to mouse 200 have been given the same numeric designations and will not be discussed further here. Mouse 250 utilizes a light source 256 that includes an LED 257 and a phosphor conversion layer 258. Phosphor conversion layer 258 includes two sub-layers shown at 259 and 260, respectively. LED 257 preferably emits light in the ultraviolet at wavelengths that are outside the visible range. Phosphor sub-layer 259 converts light in the ultraviolet to light of the desired glow color. Phosphor sub-layer 260 converts light in the ultraviolet to light in the infrared for use by the mouse imaging system. Hence, to change the glow color, only sub-layer 259 needs to be altered.

The above-described embodiments of the present invention utilize a light conversion layer that includes a phosphor or other light converting material. The light conversion layer can be constructed by suspending particles of the desired phosphor in a clear plastic carrier material such as an epoxy. Such designs are well suited to inorganic phosphors. If organic phosphors are utilized, the phosphor can often be dissolved in the carrier material.

The above-described embodiments utilize two separate sub-layers to simplify the discussion. However, embodiments in which two different phosphors are suspended or dissolved in the same layer of carrier material can also be utilized. In this case, a single layer of phosphor is incorporated in the conventional mouse design between the LED and the light pipe. Mice having different decorative glows are constructed by selecting the appropriate single layer for inclusion in the mouse at the time of fabrication.

Figure 5:
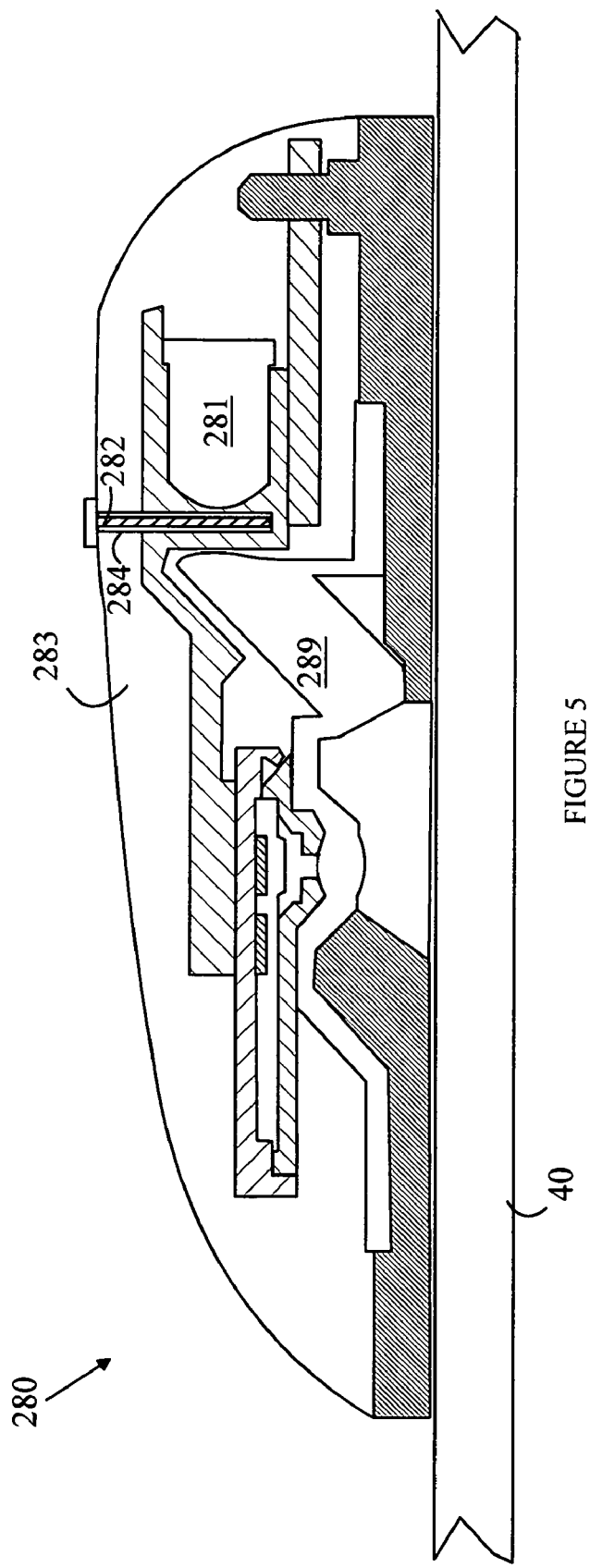
FIG. 5 illustrates a mouse 280 according to another embodiment of the present invention.

Alternative embodiments in which the end user selects the desired glow color after purchasing the mouse can also be constructed. Refer now to FIG. 5, which illustrates a mouse 280 according to another embodiment of the present invention. Mouse 280 includes an LED 281 that illuminates a phosphor layer 282 that is inserted into housing 283 through slot 284 that positions phosphor layer 282 between LED 281 and light pipe 289. The mouse is shipped with a number of different phosphor layers, each layer providing a different glow color. The user can then change the glow color at any time by changing the phosphor layer in the mouse.

Figure 6:
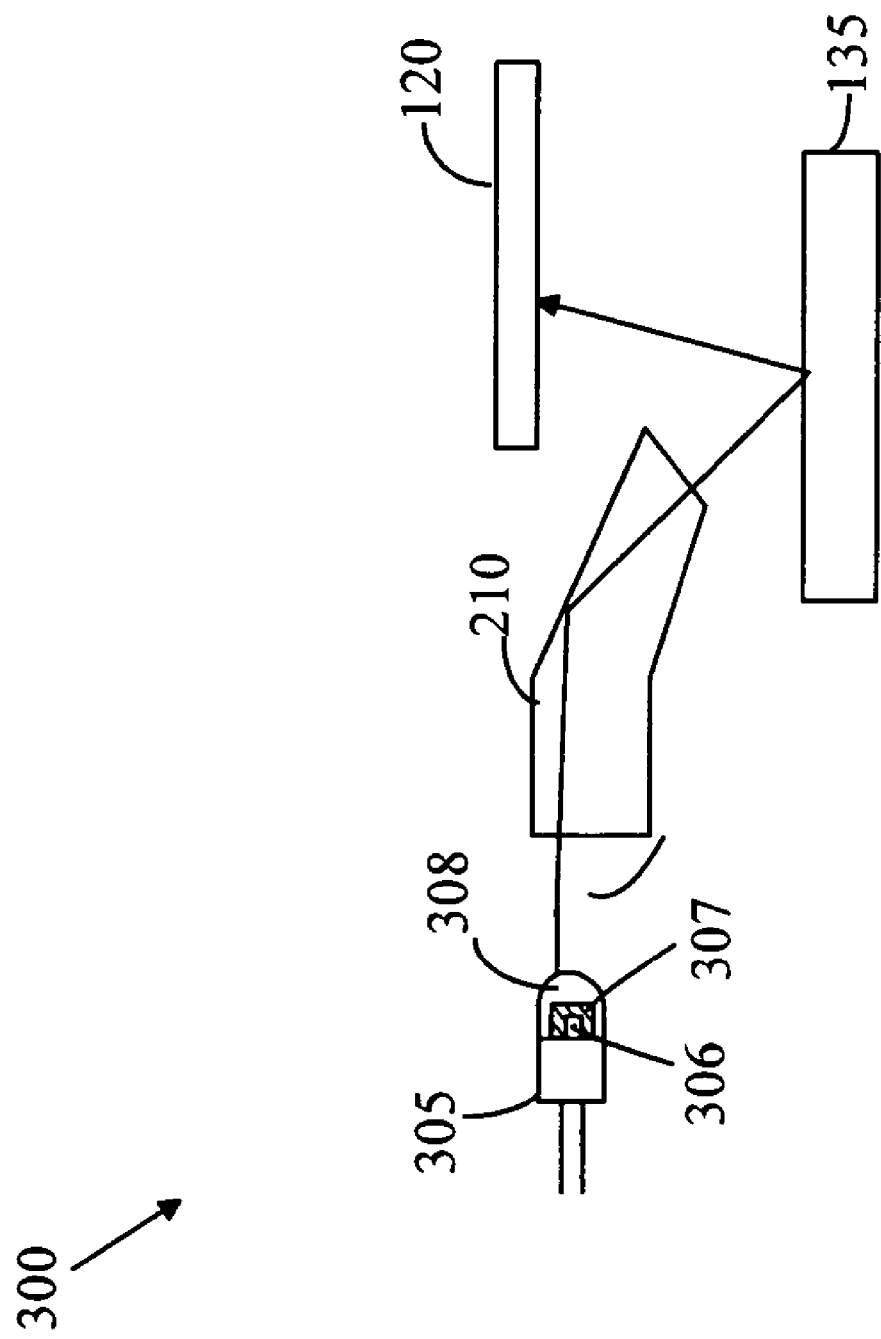
FIG. 6 illustrates a mouse 300 according to another embodiment of the present invention.

The above-described embodiments of the present invention utilize a light conversion layer that is outside of the LED. However, the light conversion layer could be incorporated within the LED. Refer now to FIG. 6, which illustrates a mouse 300 according to another embodiment of the present invention. Mouse 300 utilizes a phosphor converted LED 305. Phosphor converted LEDs are known to the art, and hence, will not be discussed in detail here. For the purposes of this discussion, it is sufficient to note that such LEDs are constructed by placing a layer 307 of phosphor over the die 306 containing the LED prior to encapsulating the LED in a transparent cap 308. Hence, by utilizing an appropriate phosphor layer over the die, an LED suitable for the present invention can be provided. Such an LED would allow current mouse designs to utilize the present invention without altering the mouse housings or optics, since the phosphor converted LED having the desired dual wavelength spectrum could be used in place of the currently used red LED.

The above-described embodiments of the present invention utilize light sources based on LEDs. However, other light sources could be utilized. For example, the LEDs discussed above could be replaced by laser diodes.

Various modifications to the present invention will become apparent to those skilled in the art from the foregoing description and accompanying drawings. Accordingly, the present invention is to be limited solely by the scope of the following claims.

What is claimed is:

1. A pointing device comprising:
   an illumination system that illuminates a surface over which said pointing device moves, said illumination system comprising only a single light-emitting device and at least one light converting layer to generate a light signal having first and second spectral regions toward said surface to illuminate said surface with said light signal, a portion of said light signal being viewable by a user of said pointing device, said first spectral region comprising visible light of a predetermined color and said second spectral region comprising infrared light, the light-emitting device being configured to emit light comprising light of a first wavelength, the light converting layer being configured to convert a portion of said light of said first wavelength to light of a second wavelength, said second wavelength being in said second spectral region, said light converting layer including a phosphor that converts said light of said first wavelength to said light of said second wavelength;
   an imaging array that records a plurality of images of said illuminated surface, said imaging array being sensitive to light in said second spectral region;
   a controller that records first and second images taken by said imaging array at different times and determines a displacement indicative of the direction and distance of said positioning device moved between said two different times, said controller further generating an illumination control signal; and
   a housing that contains said illumination system, said housing including a slot along an optical path of said light from said light-emitting device,
   wherein said light converting layer is a module that is inserted in said slot of said housing by a user of said pointing device so that at least some of said light from said light-emitting device is converted to said light of said second wavelength by said light converting layer positioned in said slot of said housing, said slot being positioned such that said optical path of said light from said light-emitting device extends through said slot and a portion of the light converting layer within the slot.

2. The pointing device of claim 1 wherein said second spectral region is from 600 nm to 1000 nm.

3. The pointing device of claim 1 wherein said second spectral region is from 800 nm to 900 nm.

4. The pointing device of claim 1 wherein said imaging array comprises a silicon imaging array.

5. The pointing device of claim 1 wherein said first wavelength is in said first spectral region.

6. The pointing device of claim 1 wherein said light converting layer further comprises a material that converts a portion of said light of said first wavelength to light of a third wavelength, said third wavelength being in said first spectral region.

7. The pointing device of claim 6 wherein said light converting layer further comprises a second phosphor that converts light of said first wavelength to light of said third wavelength.

8. The pointing device of claim 1 wherein said module is changeable by the user of said pointing device.

9. The pointing device of claim 1 wherein said light-emitting device comprises an LED.

10. The pointing device of claim 1 wherein said light-emitting device comprises a laser diode.

11. The pointing device of claim 1 further comprising a light pipe located in said housing to direct said light from said light-emitting device toward said surface, said slot being located such that said light converting layer is positioned between said light-emitting device and said light pipe when said light converting layer is inserted in said slot of said housing.

* * * * *